FIG.I.

ized Apr. 8, 1969

3,437,566
ORGANIC ACID SEPARATION BY AZEOTROPIC DISTILLATION WITH TOLUENE AND SUBSEQUENT CHEMICAL WASHING OF TOLUENE
Clive Gordon Gasser, Cottingham, and James William Hamlin, Beverley, England, assignors to BP Chemicals (U.K.) Limited, London, England, a British company
Filed Oct. 26, 1967, Ser. No. 678,344
Claims priority, application Great Britain, Nov. 9, 1966, 50,169/66
Int. Cl. B01d 3/36, 3/14
U.S. Cl. 203—33                                6 Claims

ABSTRACT OF THE DISCLOSURE

The invention is a process for separating formic acid from a mixture of formic, acetic and propionic acids by distilling with toluene to obtain a formic acid/toluene azeotrope as overhead product. The azeotrope is separated into a toluene phase and a formic acid phase, and the toluene phase is washed with sodium hydroxide or sodium metabisulphite solution before being returned to the distillation stage.

---

Figure 1:
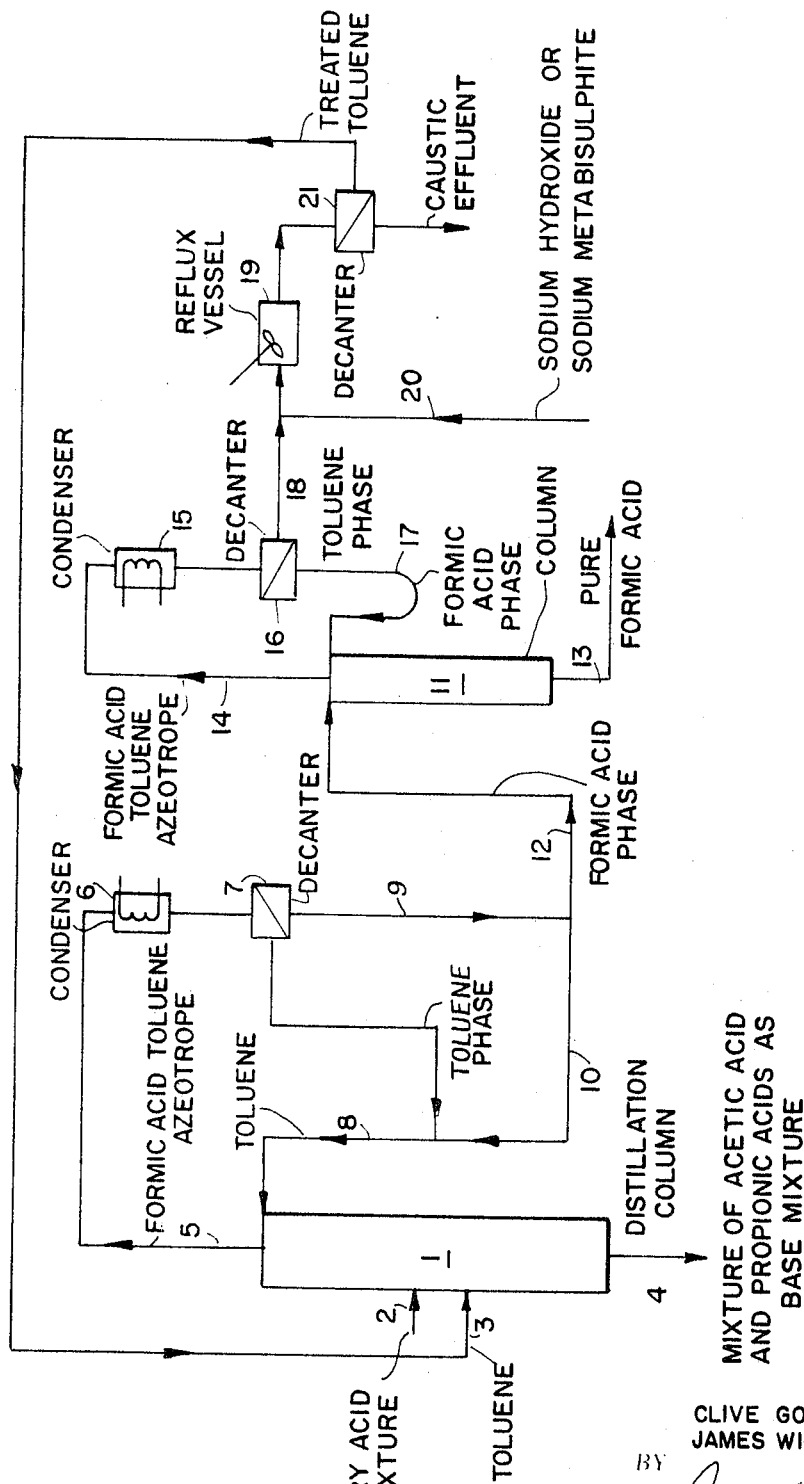

The present invention relates to a process for separating formic acid from the products of the liquid phase oxidation of hydrocarbons.

The liquid phase oxidation of hydrocarbons is a well known reaction yielding aliphatic lower acids, particularly formic, acetic and propionic, together with some esters, ketones and other compounds. The products of the reaction are separated into individual components by means of various distillation and extraction processes. One such separation scheme involves distilling a mixture of formic, propionic and acetic acids with toluene to remove a formic acid/toluene azeotrope as overhead product whilst acetic and propionic acids are removed as base product. The formic acid/toluene azeotrope is separated to give the formic acid product and toluene, which is recycled to the distillation of the formic, acetic and propionic acid mixture. The formic acid obtained by this process sometimes develops an undesirable pink colour on storage. It is an object of the present invention to provide a separation process to give formic acid which will not develop this undesirable pink colour.

Accordingly the present invention is a process for the separation of formic acid from a mixture of formic, acetic and propionic acids by distilling the mixture of acids with toluene in a distillation column to obtain a formic acid/toluene azeotrope as overhead product, separating the azeotrope into a formic acid phase and a toluene phase, recycling the toluene phase to the column and washing at least part of the toluene with sodium hydroxide solution or sodium metabisulphite solution before recycling it to the distillation column.

The formic acid phase obtained from the azeotrope will contain some toluene. In a preferred embodiment some or all of this formic acid phase is fed to a second distillation column. Formic acid is removed as base product. A second formic acid/toluene azeotrope is obtained as overhead product, and separated into a formic acid phase and a toluene phase. The formic acid phase may be returned to the second distillation column. The toluene phase may be washed with sodium hydroxide solution or sodium bisulphite solution before being returned to the first distillation column. If the toluene phase from the first azeotrope has been washed with sodium hydroxide or sodium bisulphite, it is not essential to wash this second toluene phase, although it may be beneficial. If the toluene phase from the first azeotrope has not been washed, it is essential that the second one should be.

Some of the formic acid phase from the first azeotrope may be returned to the first column, rather than fed to the second distillation column.

In one embodiment of the invention, the two formic acid/toluene azeotropes obtained as overhead product from the two distillation columns are both fed to the same decanter for separation into a formic acid phase and a toluene phase. Some or all of the formic acid phase is fed to the second distillation column, the remainder, if any, being fed to the first column. The toluene phase is washed with sodium hydroxide or sodium bisulphite before being fed to the first column.

It is preferred that the mixture of acids admitted to the first distillation column is dry. A suitable method for drying the acids is that described in British Patent 1,062,555.

When using sodium hydroxide, it is preferred to use a solution of strength approximately 20% w./w. The solution is suitably mixed with an equal volume of the toluene phase from the second formic acid/toluene azeotrope and the mixture is suitably maintained at its reflux temperature for about an hour.

When using sodium metabisulphite, it is preferred to use a solution of strength approximately 42% w./w. One volume of the solution may be mixed with about 1.5 volumes of the toluene phase and maintained at about 60° C. for about an hour.

One embodiment of the invention is illustrated in the accompanying diagram (FIGURE 1).

A dry mixture of formic, acetic and propionic acids is admitted to a first distillation column 1 via line 2. Toluene is also admitted to column 1 via line 3. A mixture of acetic and propionic acids is removed as base product via line 4 whilst a formic acid/toluene azeotrope is removed overhead via line 5. The azeotrope is condensed in a condenser 6 and separated into a formic acid phase and a toluene phase in decanter 7. The toluene phase is returned to the head of column 1 via line 8. The formic acid phase is removed via line 9 and divided into two streams, one of which is returned to the head of column 1 via lines 10 and 8, the other being admitted to the head of column 11 via line 12. Pure formic acid is removed from the base of column 11 via line 13. The overhead product, a formic acid/toluene azeotrope goes via line 14 and condenser 15 to a decanter 16, where it separates to give a formic acid phase, which is returned to the head of column 11 via line 17, and a toluene phase. The toluene phase is taken via line 18 to vessel 19 where it is reflexed with sodium hydroxide or sodium metabisulphite which is admitted via lines 20 and 18. After refluxing, the mixture is separated in decanter 21 to give a caustic effluent and treated toluene, which is returned to distillation column 1 for further use.

An example utilising the system just described was carried out as follows.

EXAMPLE 1

A dry mixture for formic, acetic and propionic acid was admitted to column 1 via line 2 and passed through the system described above. The toluene phase obtained from decanter 16 was treated continuously with an equal volume of 20% w./w. sodium hydroxide solution in a well stirred vessel, 19, heated by steam to 97°–98° C. The mixture was then cooled with water and separated in decanter 21. The treated toluene was recycled each hour to column 1 and the formic acid phase from column 11 was recycled continuously to the top plate of column 11. The residence time of the mixture in both vessel 19 and decanter 21 was one hour.

The feed rates per 100 volumes per hour of dry acids were as follows:

| | |
|---|---|
| NaOH solution | 1.64–1.71 |
| NaOH effluent | 1.88–1.91 |
| Treated toluene | 1.44–1.47 |
| Pure formic base (base product of column 11) | 14.7–16.6 |
| Effluent _____ percent w./w. as NaOH | 9.60 |
| Specific gravity | 1.208 |

The acids were subjected to this treatment for 5 days.

Figure 2:
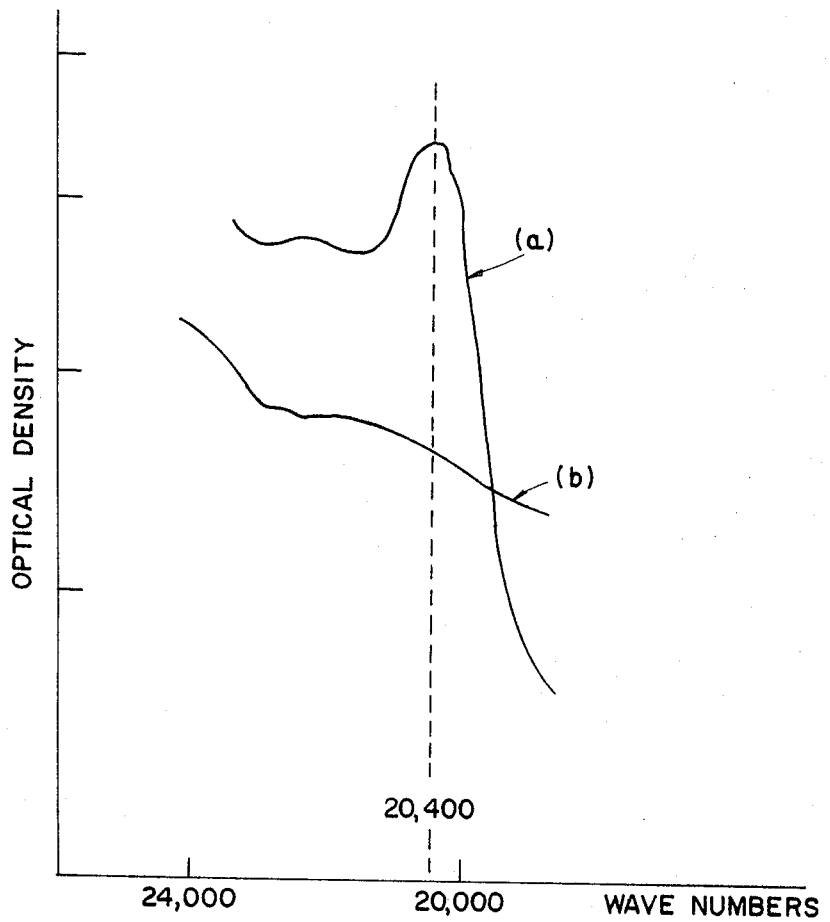

The effectiveness of the treatment was readily assessed from the colour of a formic acid phase which was produced by mixing the treated toluene phase with pure colourless formic acid (equal volumes). The mixture was stored for two days at ambient temperature in daylight and the colour of the formic acid phase was determined by spectrophotometric analysis. A sample of the untreated toluene phase was assessed in a similar manner. The spectrophotometric analyses (FIGURE 2) show that the continuous treatment was successful.

EXAMPLE 2

Figure 3:
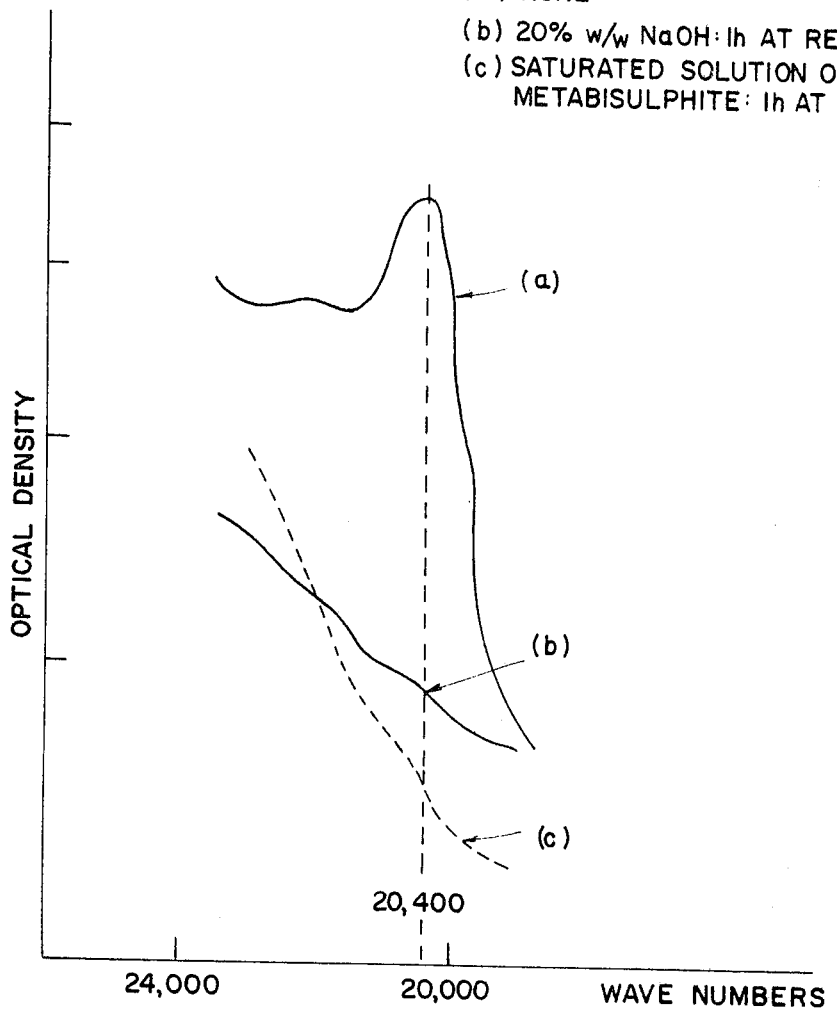

The process described in examples was repeated and the toluene phase obtained from decanter 16 was treated batchwise with an equal volume of a 20% w./w. aqueous solution of sodium hydroxide. The mixture was maintained at reflux for one hour and then cooled to room temperature and the two phases were separated. The spectrophotometric results are given in FIGURE 3, showing that the treatment was successful.

EXAMPLE 3

The process described in examples was repeated and the toluene phase obtained from decanter 16 was treated batchwise with an equal weight of a saturated solution of sodium metabisulphite (42% w./w.) and the mixture was maintained at 60° C. for one hour. The mixture was cooled to room temperature and the two phases were separated. The spectrophotometric results are given in FIGURE 3, showing that the treatment was successful.

We claim:

1. A process for the separation of formic acid from a mixture of formic, acetic and propionic acids by distilling the mixture of acids with toluene in a distillation column to obtain a formic acid/toluene azeotrope as overhead product, separating the azeotrope into a formic acid phase and a toluene phase, recycling the toluene phase to the column and washing at least part of the toluene with a reagent selected from the group consisting of a sodium hydroxide solution and a sodium metabisulphite solution before recycling it to the distillation column.

2. A process according to claim 1 which comprises distilling a mixture of formic, acetic and propionic acids with toluene in a first distillation column to obtain a first formic acid/toluene azeotrope as overhead product, separating the azeotrope into a first formic acid phase and a first toluene phase, distilling the first formic acid phase in a second distillation column to obtain formic acid as base product and a second formic acid/toluene azeotrope as overhead product, separating the second azeotrope into a second toluene phase and a second formic acid phase, washing the second toluene phase with a reagent selected from the group consisting of a sodium hydroxide solution and a sodium metabisulphite solution and recycling it to the first distillation column.

3. A process according to claim 2 wherein the first toluene phase is washed with a reagent selected from the group consisting of a sodium hydroxide solution and a sodium metabisulphite solution before being returned to the first distillation column.

4. A process according to claim 2 wherein the first and second formic acid/toluene azeotropes are fed to the same decanter and separated into a formic acid phase and a toluene phase.

5. A process according to claim 2 wherein some or all of the second formic acid phase is refluxed to the second distillation column.

6. A process according to claim 2 wherein some of the second formic acid phase is recycled to the first distillation column.

References Cited

UNITED STATES PATENTS

| | | | |
|---|---|---|---|
| 1,813,636 | 7/1931 | Petersen et al. | 203—69 |
| 2,859,154 | 11/1958 | Othmer | 203—69 |
| 3,024,170 | 3/1962 | Othmer et al. | 260—542 |
| 3,084,109 | 4/1963 | Ure et al. | 203—37 |
| 3,258,482 | 6/1966 | Sennewald et al. | 203—32 |

FOREIGN PATENTS

| | | |
|---|---|---|
| 271,044 | 12/1927 | Great Britain. |
| 1,031,762 | 6/1966 | Great Britain. |

WILBUR L. BASCOMB, JR., *Primary Examiner.*

U.S. Cl. X.R.

203—37, 69, 82, 42; 260—533, 540, 541, 542